April 24, 1956  J. T. CARMICHAEL  2,742,980
ACTUATING MECHANISM FOR DRAWWORKS BRAKES
Filed Feb. 6, 1952  3 Sheets-Sheet 1

J. T. Carmichael
INVENTOR.

BY Gustave Miller
ATTORNEY

April 24, 1956   J. T. CARMICHAEL   2,742,980
ACTUATING MECHANISM FOR DRAWWORKS BRAKES
Filed Feb. 6, 1952   3 Sheets-Sheet 2

J. T. Carmichael
INVENTOR.

BY Gustave Miller
ATTORNEY

April 24, 1956     J. T. CARMICHAEL     2,742,980
ACTUATING MECHANISM FOR DRAWWORKS BRAKES
Filed Feb. 6, 1952     3 Sheets-Sheet 3
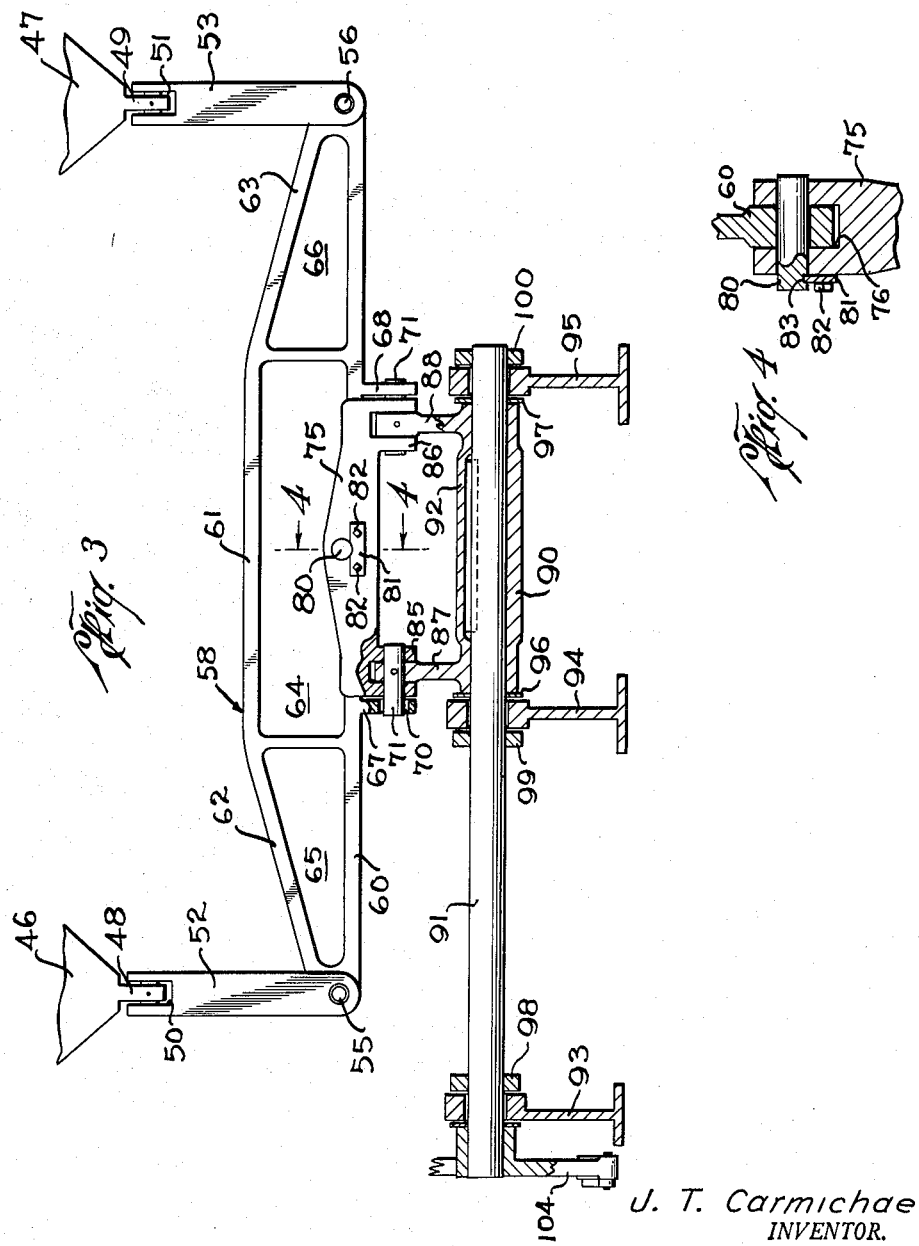
J. T. Carmichael
INVENTOR.
BY Gustave Miller
ATTORNEY

United States Patent Office 2,742,980
Patented Apr. 24, 1956

2,742,980

ACTUATING MECHANISM FOR DRAWWORKS BRAKES

James T. Carmichael, Shreveport, La., assignor to The Brewster Company, Shreveport, La.

Application February 6, 1952, Serial No. 270,137

4 Claims. (Cl. 188—77)

This invention relates to an actuating mechanism for drawworks brakes, and particularly to an actuating mechanism for the two band type of drawworks brakes.

One of the objects of the invention is to provide a brake actuating mechanism wherein in the event of breakage in the mechanism of one of the brake bands, the other brake band alone can assume the full braking load.

Another object of this invention is to provide a brake actuating mechanism for drawworks brakes having a live end equalizer with a central balance pin to provide for balancing of the load assumed by each brake band when used on the two brake band type of drawworks brake.

Another object of this invention is to provide a brake actuating mechanism for a two band type of drawworks brake wherein a live end equalizer is pivoted on a balance pin and wherein the equalizer has lugs thereon with openings therein for receiving pins, which pins are capable of holding the live end equalizer in the event of breakage of the balance pin.

Another object of this invention is to provide in a brake actuating mechanism for drawworks brakes a live end equalizer supported by a cross member extending about the equalizer for a considerable portion of the length thereof so as to reduce heavy vibration of the equalizer.

Another object of this invention is to provide in an actuating mechanism for drawworks brakes, a live end equalizer for a pair of brake bands, a U-shaped cross member for mounting the equalizer to prevent heavy vibration thereof, and a balance pin extending through the cross member and the equalizer to prevent pivoting of the equalizer so that an equal load is assumed by each brake band.

Another object of this invention is to provide in an actuating mechanism for drawworks brakes, a live end equalizer for a pair of brake bands, a U-shaped cross member for mounting the equalizer to prevent heavy vibration thereof, and a balance pin extending through the cross member and the equalizer to prevent pivoting of the equalizer so that an equal load is assumed by each brake band, which equalizer has thereon spaced lugs which are mounted on pins extending from a bracket, the lugs having openings therein which are of larger size than the other diameter of the pins so that the equalizer normally may pivot a limited amount about the central balance pin.

Another object of the invention is to provide in an actuating mechanism for drawworks brakes a hand lever connected through a particular linkage to the brake shaft to provide for increased torque to the brake shaft.

Other and further objects of this invention will become apparent when the following description is considered in connection with the accompanying drawings, wherein:

Fig. 3 is an extended plan view of the brake shaft and the equalizer connected therewith, which structure forms a part of the actuating mechanism of this invention.

Fig. 4 is a sectional view taken on line 4—4 of Fig. 3 and illustrates one manner of securing the balance pin for holding the equalizer within the U-shaped cross member.

Figure 1:
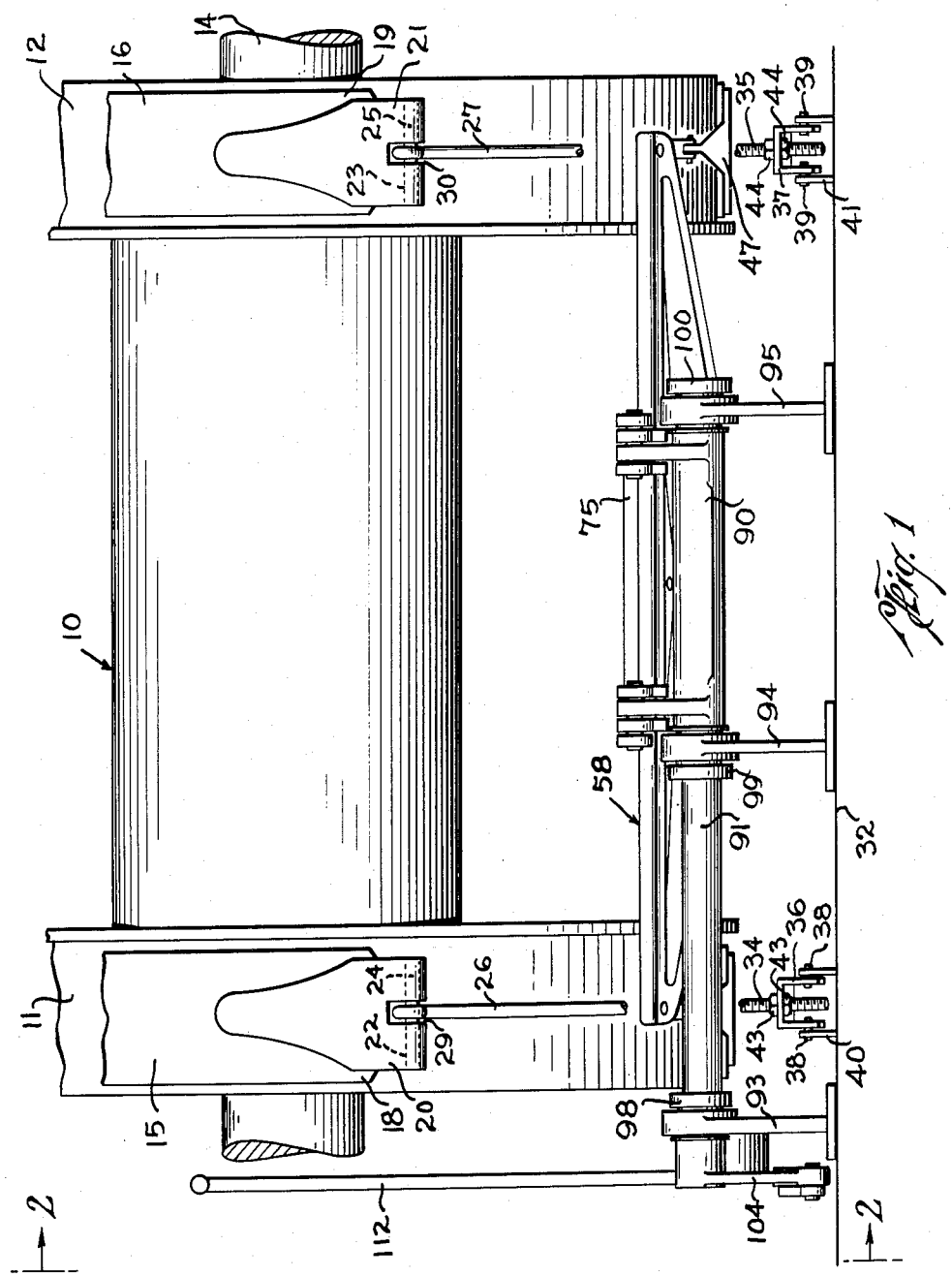
Fig. 1 is an elevational view illustrating a typical two band drawworks brake and showing the relationship thereto of the actuating mechanism of this invention.

In Fig. 1 can be seen the drawworks drum generally designated by the numeral 10. At each end of the drawworks drum 10 is located a brake drum designated by the numerals 11 and 12. This drawworks drum 10 and its connected brake drums 11 and 12 are mounted on a shaft 14 and are driven by any suitable drive means as are well known in the art. The brake drums 11 and 12 have positioned thereabout the brake bands 15 and 16, respectively.

At the dead ends 18 and 19 of the brake bands 15 and 16, respectively, are positioned clips 20 and 21. These clips 20 and 21 may be formed integrally with the brake band itself or they may be separate clips which are secured by rivets or other suitable securage. These clips 20 and 21 each provide an opening or slot 22 and 23 into which is received a pin 24 and 25 respectively. These pins 24 and 25 each connected to an elongated rod 26 and 27 respectively which fit into an open notch 29 and 30 respectively in the clips 20 and 21.

These rods 26 and 27 may be mounted for adjustment in numerous ways so long as they are mounted on a fixed structure such as the main frame 32. The threaded ends 34 and 35 of the rods 26 and 27 respectively fit into brackets 36 and 37 which are pivoted at 38 and 39 to a fixed bracket 40 and 41 respectively. The threaded ends 34 and 35 are suitably adjusted by threading into the lock nuts 43 and 44.

At the opposite ends of the bands 15 and 16 from the dead ends 18 and 19 are the live ends 46 and 47. The live ends 46 and 47 may be constructed in numerous ways but as best seen in Fig. 3 they each preferably have a lug 48 or 49 respectively which is pivotally mounted on a pin 50 or 51. These pins 50 and 51 are mounted in openings in universal links 52 and 53 respectively. These links 52 and 53 are termed universal links because they provide for substantially vertical movement about the pins 50 and 51 and for substantially horizontal movement about the pins 55 and 56 respectively.

These pins 55 and 56 pass through openings in the ends of the links 52 and 53 respectively and also through openings in the ends of the equalizer 58.

The equalizer 58 may take numerous forms but the preferred form as best seen in Fig. 3 has a straight rear bar 60 extending substantially the entire length of the equalizer 58. On the front side of the equalizer 58 is a straight section 61 and two inclinde sections 62 and 63. The inclined sections 62 and 63 provide for tapered end sections converging at the openings provided for the pins 55 and 56.

Figure 5:
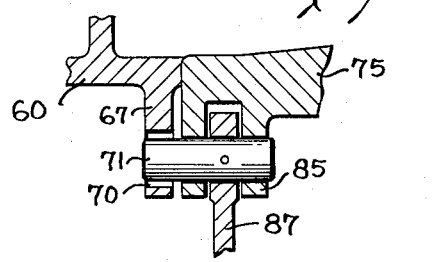
Fig. 5 is a detailed sectional view of one of the locking pins of this invention, showing its mounting wth respect to the cross member and equalizer.

Thus there is provided in the equalizer 58 a central portion 64 and two tapered end portions 65 and 66. Mounted on the straight rear edge or bar 60 of the central portion 64 are lugs 67 and 68. Each of the lugs 67 and 68 have an opening therein such as the opening 70 illustrated in Figs. 3 and 5 for the pins 71. It will be observed that this opening 70 is of larger diameter than the diameter of the pin 71 and the advantages of this construction will be described more in particular hereinafter.

To support the equalizer 58 and prevent heavy vibration thereof, a cross member 75 of U-shape, as best seen in Fig. 4, has provided therein a notch 76 for receiving the rear edge or bar 60 of the central panel 64. This cross member 75 extends for a considerable portion of the length of the equalizer 58 to thereby reduce heavy vibration as best seen in Fig. 3. It will be appreciated that this cross member 75 may be even longer in length if the length as shown in Fig. 3 is not sufficient under unusual conditions to prevent heavy vibration of the equalizer 58. This cross member 75 is so constructed that the width of the notch 76 is only slightly larger than the width of the rear edge 60 so that there is very little clearance between the surfaces of the rear edge 60 and the inside surfaces of the notch 76. This also contributes toward stabilizing the vibration of the equalizer 58. The cross member 75 is mounted on the equalizer 58 by a balance pin 80 which passes through openings in the U-shaped portion of the cross member 75 and through the end section 60 of the equalizer 58. As can be seen in Fig. 4 this balance pin 80 may be keyed to the cross member 75 by a key 81 held in position by a screw or bolt 82, the key 81 fitting into a notch 83 in the balance pin 80.

At the rear edge of the cross member 75 are two sets 85 and 86 of spaced projections which have openings therein to receive the pins 71. The pins 71 are secured to arms 87 and 88 of the control lever 90 by locking pins or keys or any other suitable securing means. It will be observed that there is very little clearance between the pins 71 and the openings in the projections 85 and 86 extending from the cross member 75. However, as previously pointed out in connection with Fig. 5 the openings 70 and the similar opening in the lug 68 are larger in diameter than the pins 71 thereby permitting limited movement of the equalizer 58 about the central balance pin 80, the lugs 67 and 68 in effect acting as a stop means to limit the travel of the equalizer 58. This construction also permits the locking pins 71 to hold the equalizer 58 in the event the balance pin 80 shears or is otherwise broken, thus providing a safety feature in this construction.

The control lever 90 is mounted on the brake shaft 91 by any suitable means such a key as shown in Fig. 3. The brake shaft 91 is suitably mounted upon support members 93, 94 and 95, which support members are positioned on the main frame 32 or any other suitable support base to which they may be secured. The brake shaft 91 can rotate in the openings of the support members 93, 94 and 95. The control lever 90 is positioned between the support members 94 and 95 as seen in Fig. 3 and may have positioned inside thereof wear washers 96 and 97 if desired. To prevent axial movement of the brake shaft 91 on the support members 93, 94 and 95 stop rings 98, 99 and 100 may be used. The stop rings may be integral with the brake shaft 91 or may be suitably secured thereto. Thus, it can be seen that the rotational movement imparted to the brake shaft 91 will be transmitted through the control lever 90 for the application of the braking force to the brake bands 15 and 16.

Figure 2:
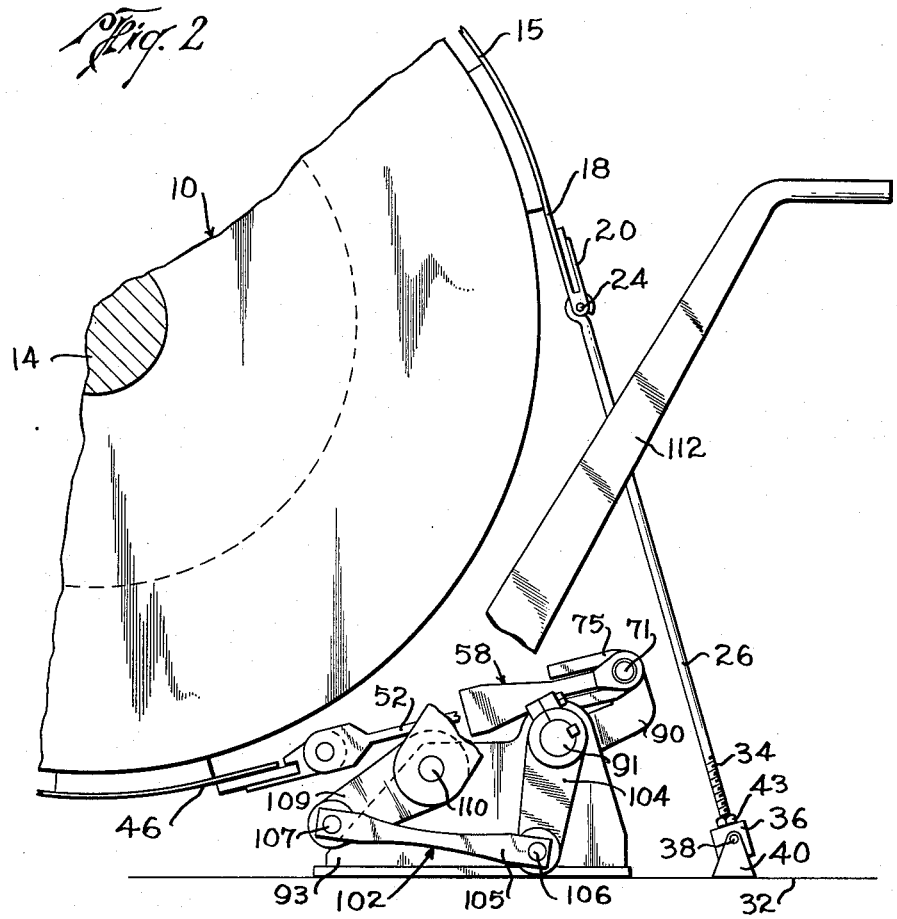
Fig. 2 is a partial end elevational view illustrating the particular hand control linkage for the brake shaft and the relationship thereto with respect to the drawworks drum.

At one end of the brake shaft 91 is positioned the hand control linkage generally designated by the numeral 102, as best seen in Fig. 2. This linkage 102 includes an actuating lever 104 keyed or otherwise secured to the brake shaft 91. The actuating lever 104 is connected to a link 105 by a pin 106. At the other end of the link 105 is a pin 107 to which is connected a power lever 109. At the opposite end of the lever 109 from the pin 107, the lever 109 is mounted on the shaft 110. The hand lever 112 is also mounted on the shaft 110 and both the hand lever 112 and the power lever 109 are secured to the shaft 110 so that upon movement of the hand lever 112 rotational movement is transmitted through the shaft 110 to the power lever 109. The movement of the power lever 109 is transmitted through the link 105 to the lever 104 which is connected to the brake shaft 91. As has been previously explained the movements of the brake shaft 91 is transmitted to the control lever 90 and thence to the brake bands 46 and 47.

From the above description and the drawings it will be appreciated that in the event of a breakage of one of the brake bands 15 or 16 that due to the equalizer structure 58 and a balance pin 80 and locking pin 71, the breaking load will be assumed by the remaining brake band.

It is thus believed apparent that a mechanism has been devised wherein of the two brake bands may assume the braking load in the event of failure in one of the bands, and wherein the load is distributed between the two brake bands normally through an equalizer pivoting about a balance pin, the movement of the equalizer being limited by stop or locking pins, which also serve as a means for holding the equalizer in the event of breakage of the balance pin. As has also been previously pointed out, the construction of the cross member with respect to the equalizer is such that heavy vibration of the equalizer is prevented.

Broadly this invention contemplates an actuating mechanism for drawworks brakes wherein an equalizer is mounted for transmitting braking force to a pair of brake bands, such equalizer being limited in its pivotal movement.

What is claimed is:

1. An actuating mechanism for drawworks brakes comprising a drawworks drum, a brake drum adjacent each end of said drawworks drum, a brake band for each brake drum, an equalizer for said brake bands, means connecting said equalizer to said brake bands, a brake shaft, support means therefor, brake actuating means mounted on said brake shaft for rotation therewith, said brake actuating means including a pair of brake actuating levers each of which has a pin mounted therewith, a crossmember mounted on the brake actuating lever pins, a pivot pin connecting said cross member to said equalizer to permit said equalizer to pivot with respect to said crossmember, lugs on said equalizer, each lug having an opening therein to receive one of said brake actuating lever pins, each lug opening being larger than its brake actuating lever pin so that the pivoting movement of the equalizer is permitted but is limited upon contact of the brake actuating lever pins with the inside surface of the openings, and a brake operating means to rotate said brake shaft for frictionally engaging the brake bands with the brake drums.

2. In a mechanism for actuating a pair of spaced brake bands on a drum, a brakeshaft, a cross member, a brake actuating means mounted on said shaft for supporting said crossmember, an equalizer, a pivot pin mounting said equalizer with said crossmember for pivotal movement with respect thereto, and means connecting said brake actuating means to said crossmember and to said equalizer to limit the extent of pivotal movement of said equalizer.

3. In an actuating mechanism for drawworks brakes, a brakeshaft, a brake actuating means mounted on said brakeshaft for rotation therewith, said brake actuating means including spaced brake actuating levers, a pin mounted in each brake actuating lever, an equalizer having spaced lugs thereon, each of said lugs having an opening therein for receiving a portion of each brake actuating lever pin, the openings in the equalizer lugs being larger than the pins to permit relative movement of said lugs with respect to said pins, and said pins serving as an emergency actuating connection between said brake actuating means and said equalizer.

4. In an actuating mechanism for a two-band drawworks brake, a brake shaft, a pair of brake actuating lugs on said brake shaft mounted for rotation therewith, a U-shaped cross member, a pair of lugs on said cross member, adjacent said brake actuating lugs, an equalizer having a spaced pair of lugs thereon adjacent said brake actuating lugs, all of said lugs having aligned apertures therein, one each, of the pairs of brake actuating lugs, cross member carried lugs, and equalizer lugs comprising a set, a pin connecting each set of lugs extending through the aligned apertures of each set, the apertures of the equalizer carried lugs being larger than those of the other lugs whereby upon breakage of an operating portion of one brake band of said drawworks brake, said pin connection transfers the entire load to the other brake band.

References Cited in the file of this patent

UNITED STATES PATENTS

| | | |
|---|---|---|
| 1,597,360 | Harris | Aug. 24, 1926 |
| 1,706,921 | Greve | Mar. 26, 1929 |
| 1,788,141 | Attridge | Jan. 6, 1931 |
| 1,910,805 | MacClatchie | May 23, 1933 |
| 1,956,433 | Young et al. | Apr. 24, 1934 |
| 2,053,541 | Tremolada | Sept. 8, 1936 |
| 2,389,031 | Davidson | Nov. 13, 1945 |
| 2,414,677 | Tremolada | Jan. 21, 1947 |